(12) United States Patent
Allen et al.

(10) Patent No.: US 8,400,688 B2
(45) Date of Patent: Mar. 19, 2013

(54) MOUNTING BRACKET FOR IMAGE SENSING UNIT OF A SCANNER

(75) Inventors: Eugene David Allen, Richmond, KY (US); Chengwu Cui, Lexington, KY (US); Joshua Tyler Strow, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 323 days.

(21) Appl. No.: 12/980,059

(22) Filed: Dec. 28, 2010

(65) Prior Publication Data

US 2012/0162722 A1 Jun. 28, 2012

(51) Int. Cl.
*H04N 1/04* (2006.01)
(52) U.S. Cl. ......... 358/474; 358/496; 358/497; 358/498
(58) Field of Classification Search .................. 358/474, 358/496, 497, 498, 475
See application file for complete search history.

(56) References Cited

U.S. PATENT DOCUMENTS 5,152,355 A * 10/1992 Copus ........................... 177/128

* cited by examiner

*Primary Examiner* — Houshang Safaipour
(74) *Attorney, Agent, or Firm* — John Victor Pezdek; Justin M Tromp

(57) ABSTRACT

A mounting bracket for an image sensing unit of a scanner according to one example embodiment includes a first portion and a second portion extending from the first portion. The first portion has a plurality of elongated holes therein each for receiving a fastener to mount the mounting bracket to a scan head frame. The second portion includes a cutout section therein for allowing an image sensor of the image sensing unit to receive an image from an optical unit of the scanner. A pivot hole in the first portion is centered about a width of the cutout section. When the mounting bracket is mounted on the scan head frame, the elongated holes in the first portion permit linear adjustment of the mounting bracket relative to the scan head frame and the pivot hole permits angular adjustment of the mounting bracket relative to the scan head frame.

18 Claims, 4 Drawing Sheets

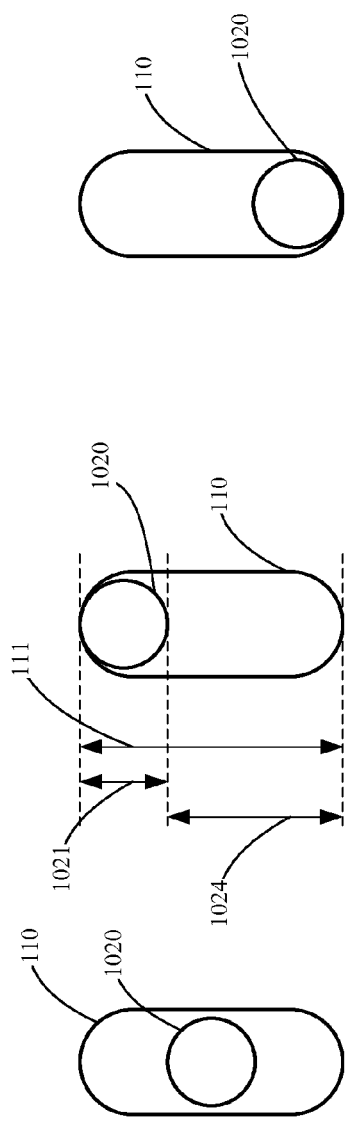
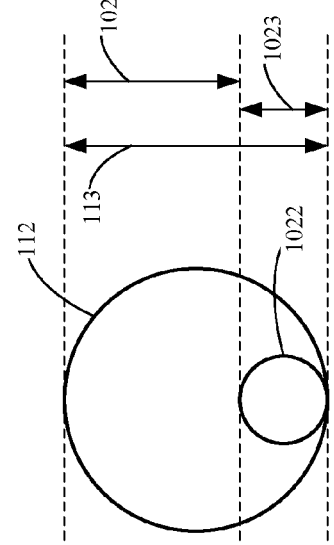
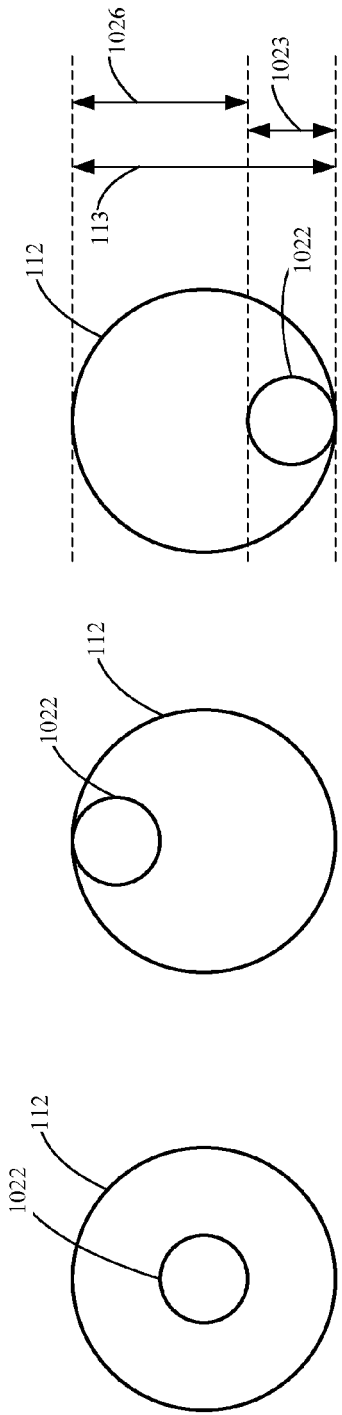
Figure 3A  Figure 3B  Figure 3C
Figure 4A  Figure 4B  Figure 4C

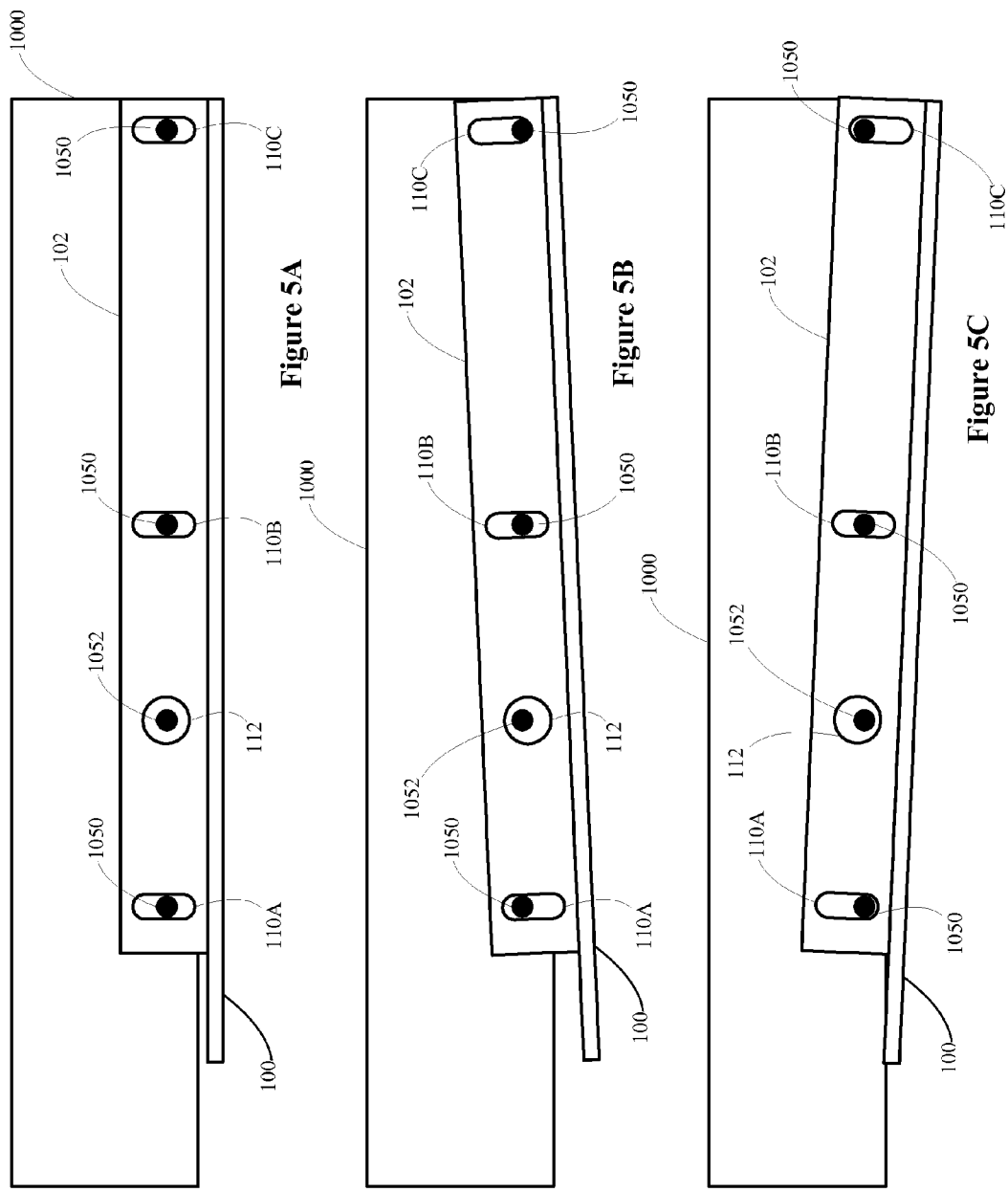

MOUNTING BRACKET FOR IMAGE SENSING UNIT OF A SCANNER

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Disclosure

The present disclosure relates generally to the arrangement of an image sensing unit on a scan head frame of a scanner and, more particularly, to a mounting bracket for mounting an image sensing unit on a scan head frame of a scanner.

2. Description of the Related Art

A scanner may employ a scan head which includes an optical unit such as a lens reduction system. The optical unit may include a lens and a set of mirrors adapted to be carried by a scan head frame of the scan head. The optical unit is responsible for forming an image of a document to be scanned onto an image sensing unit mounted to the scan head frame. The image sensing unit includes an image sensor and a printed circuit board operatively coupled to the image sensor. The printed circuit board is operatively connected to a processor or controller in the scanner where image data from the image sensor is processed further.

Scanners may include part variations that can cause the image of the document scanned on the image sensing unit to be non-ideal, e.g., misaligned, out of focus, etc. To overcome such variations, it may be necessary to adjust or tune the image sensing unit relative to the optical unit. Specifically, angular adjustment of the image sensor or focal length adjustment between the image sensor and the lens may be required. For example, angular adjustment may be performed by adjusting the angle of the image sensor relative to a vertical centerline of the optical unit such that the image of the document focused by the lens is uniformly received on the image sensor. Further, focal length adjustment may be performed by adjusting the distance between the image sensor and the optical unit to achieve a desired magnification of the image on the image sensor.

Once adjustment and/or tuning is complete, the image sensing unit must be mounted on the scan head frame in a manner that ensures stability. Specifically, once the image sensing unit is properly aligned with respect to the optical unit and mounted on the scan head frame, it may be desired that the image sensing unit remain aligned with the optical unit for the life of the scanner. For example, the image sensing unit should be able to withstand a certain degree of force without losing its alignment with the optical unit. Otherwise slight movement of the image sensing unit could result in decreased image quality. Accordingly, it will be appreciated that a bracket that provides stability and allows alignment and tuning of the image sensing unit relative to the optical unit is desired.

SUMMARY OF THE DISCLOSURE

A mounting bracket for an image sensing unit of a scanner according to one example embodiment includes a first portion and a second portion extending from the first portion. The first portion has a plurality of elongated holes therein each for receiving a fastener to mount the mounting bracket to a scan head frame. The second portion has a cutout section therein for allowing an image sensor of the image sensing unit to receive an image from an optical unit of the scanner. A pivot hole in the first portion is centered about a width of the cutout section. When the mounting bracket is mounted on the scan head frame, the elongated holes in the first portion permit linear adjustment of the mounting bracket relative to the scan head frame and the pivot hole in the first portion permits angular adjustment of the mounting bracket relative to the scan head frame for optically adjusting the image sensing unit. In some embodiments, the second portion includes a plurality of holes therein each for receiving a fastener to mount the image sensing unit to the second portion of the mounting bracket. Further embodiments include those wherein the second portion includes a plurality of rib portions each having one of the plurality of holes in the second portion therein.

A scan head for a scanner according to one example embodiment includes a scan head frame having a top surface and a side surface. The top surface has a plurality of holes therein. An optical unit is mounted to the scan head frame. The optical unit includes a lens assembly. An image sensing unit having an image sensor is mounted to the scan head frame by a mounting bracket. The mounting bracket has a first portion and a second portion extending from the first portion. The image sensing unit is mounted to the second portion of the mounting bracket and faces the side surface of the scan head frame. The first portion of the mounting bracket has a plurality of holes therein. The second portion of the mounting bracket has a cutout section therein that allows the image sensor to receive an image from the optical unit. A first plurality of fasteners each extend through one of the plurality of holes in the first portion of the mounting bracket and a corresponding one of the plurality of holes in the top surface of the scan head frame to mount the mounting bracket to the scan head frame. A pivot hole in the first portion of the mounting bracket is centered about the image sensor and aligned with a corresponding pivot hole in the top surface of the scan head frame. The plurality of holes in the first portion of the mounting bracket permits adjustment of the focal length between the image sensor and the lens assembly. The pivot hole in the first portion of the mounting bracket permits angular adjustment of the image sensor relative to the optical unit.

Some embodiments include a plurality of holes in the second portion of the mounting bracket and a corresponding plurality of holes in the image sensing unit. A second plurality of fasteners each extend through one of the holes in the second portion of the mounting bracket and a corresponding one of the holes in the image sensing unit to mount the image sensing unit to the second portion of the mounting bracket. Further embodiments include those wherein the second portion of the mounting bracket includes a plurality of rib portions each having one of the plurality of holes in the second portion therein.

In some embodiments, the pivot hole in the first portion of the mounting bracket has a larger diameter than the corresponding pivot hole in the top surface of the scan head frame to provide a range of adjustment of the mounting bracket relative to the scan head frame. Embodiments include those wherein the plurality of holes in the first portion of the mounting bracket are either circular or elongated and the corresponding holes in the top surface of the scan head frame are circular. In such embodiments, the plurality of holes in the first portion have a length that is greater than a diameter of the corresponding holes in the top surface of the scan head frame to provide a range of adjustment of the mounting bracket relative to the scan head frame.

A method for assembling a scan head for a scanner according to one example embodiment includes mating a mounting bracket having an image sensing unit mounted thereto to a scan head frame. The mounting bracket is partially secured to the scan head frame. A pin is inserted through a pivot hole in the mounting bracket and through a corresponding pivot hole in a top surface of the scan head frame. At least one of the linear position and the angular position of the image sensing unit is adjusted relative to an optical unit mounted to the scan head frame. In some embodiments, this adjustment is performed in response to an analysis of a focal length between an image sensor of the image sensing unit and a lens assembly of the optical unit and/or an angular position of the image sensor relative to the optical unit. After the adjustment is complete, the mounting bracket is secured to the scan head frame. The pin is removed from the pivot hole in the top surface of the scan head frame and the pivot hole in the mounting bracket.

BRIEF DESCRIPTION OF THE DRAWINGS

The above-mentioned and other features and advantages will become more apparent and will be better understood by referencing the following embodiments taken in conjunction with the accompanying drawings, wherein:

FIGS. 3A-3C illustrate various positions of elongated holes in a first portion of the with respect to corresponding bracket mounting holes in the scan head frame at various angular alignments;

FIGS. 4A-4C illustrate various positions of a pivot hole in the mounting bracket with respect to a corresponding pivot hole in the scan head frame at various angular alignments; and FIGS. 5A-5C illustrate various modes of adjusting the angular alignment of an image sensing unit relative to an optical unit mounted with the scan head frame.

DETAILED DESCRIPTION

Figure 1:
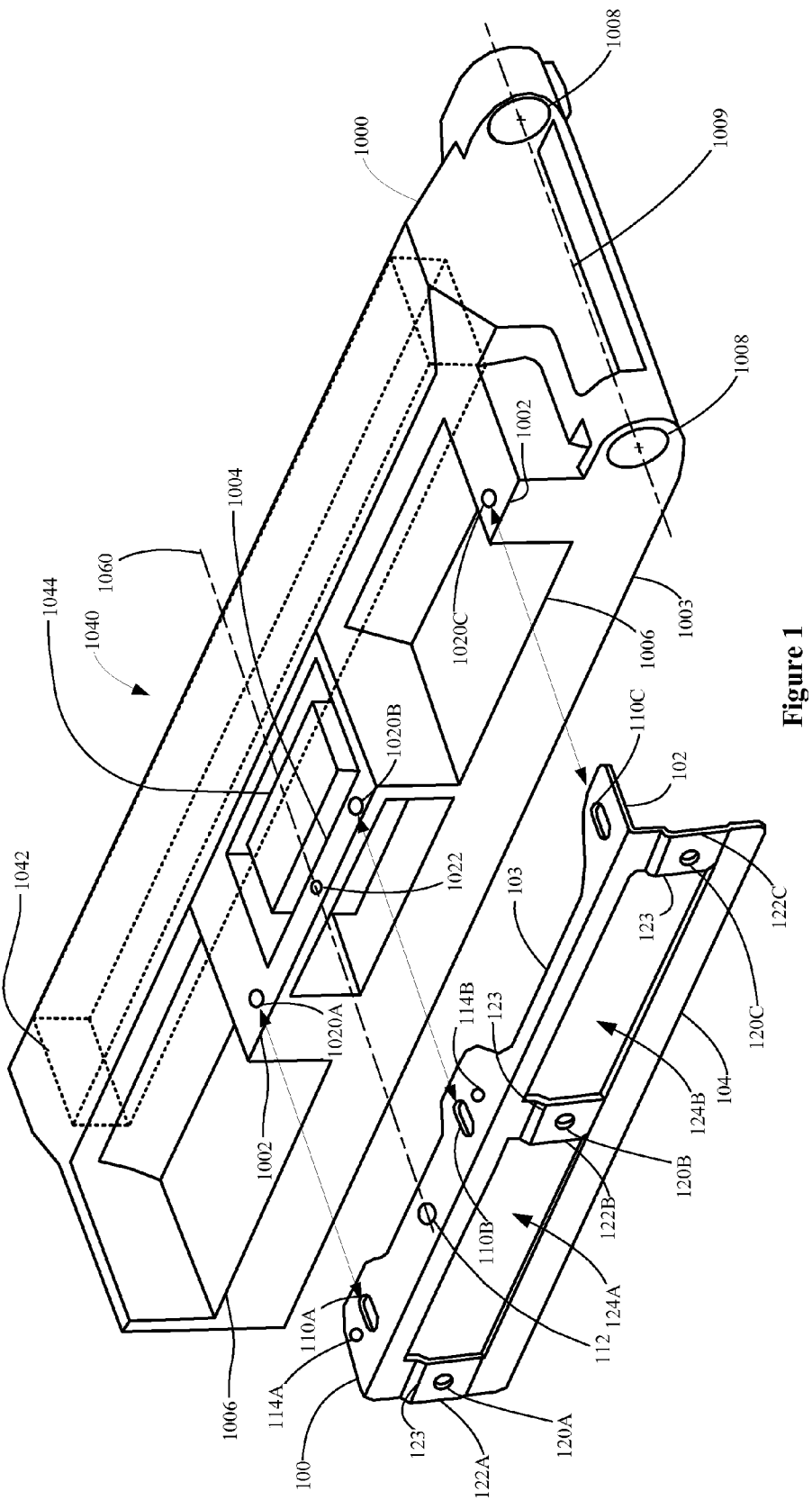
FIG. 1 is an exploded perspective view of a mounting bracket aligned beside a scan head frame of a scanner according to one example embodiment.

The following description and drawings illustrate embodiments sufficiently to enable those skilled in the art to practice it. It is to be understood that the disclosure is not limited to the details of construction and the arrangement of components set forth in the following description or illustrated in the drawings. The invention is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present invention is defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, use of the terms "vertical" and "horizontal" make reference to the orientation of the image sensor, optical assembly and scan head frame illustrated in the figures and other orientations of the foregoing can be used for these components.

Referring to FIG. 1, an example embodiment of a mounting bracket 100 carried by a scan head frame 1000 of a scanner is shown. Mounting bracket 100 includes a first portion 102 and a second portion 104 extending from first portion 102 generally forming a right angle therebetween such that mounting bracket 100 has a generally L-shaped cross section. The L-shape of mounting bracket 100 allows it to be conveniently received on a longitudinal edge 1002 of scan head frame 1000.

Embodiments include those wherein the outer periphery 103 of first portion 102 is non-uniform (having depressions and/or elevations). Alternatives include those wherein the outer periphery 103 of first portion 102 is uniform such that first portion 102 is generally rectangular in shape. First portion 102 of the mounting bracket 100 includes a plurality of holes 110. The plurality of holes 110 facilitate mounting of first portion 102 along and adjacent to longitudinal edge 1002 of scan head frame 1000. In some embodiments, each of the plurality of holes 110 is an elongated hole or slot transversely positioned on first portion 102. Alternatives include those wherein each of the holes 110 is circular. The example embodiment illustrated includes three holes 110A, 110B, 110C. Alternatives include those wherein first portion 102 includes two or, alternatively, four or more holes 110. First portion 102 also includes a pivot hole 112. In the example embodiment illustrated, pivot hole 112 is circular; however, any suitable shape may be used including an elongated hole or slot. Holes 110 and pivot hole 112 facilitate translational and angular adjustment of mounting bracket 100 when mounted on scan head frame 1000 as explained in greater detail below. In some embodiments, first portion 102 further includes a pair of fixture holes 114A, 114B for receiving an alignment fixture (not shown) therein to linearly and angularly adjust mounting bracket 100 relative to scan head frame 1000. In the example embodiment shown, fixture holes 114A, 114B are positioned adjacent to holes 110A, 110B opposite from pivot hole 112.

Second portion 104 of mounting bracket 100 includes a plurality of holes 120. In the example embodiment shown, holes 120 are circular; however, any suitable shape may be used. In some embodiments, the plurality of holes 120 are threaded to receive a screw or other type of threaded fastener. Embodiments include those wherein second portion 104 also includes a plurality of rib portions 122, each of which contains at least one of the plurality of holes 120 therein. Rib portions 122 are generally parallel to each other. The plurality of holes 120 facilitate mounting of an image sensing unit 1010 (FIG. 2) on the scan head frame 1000. The example embodiment illustrated includes three holes 120A, 120B, 120C each formed in a respective one of three rib portions 122A, 122B, 122C. Alternatives include those wherein second portion 104 includes two or, alternatively, four or more holes 120 and/or rib portions 122.

Second portion 104 includes at least one cutout section 124 formed between rib portions 122. In the example embodiment shown, second portion 104 includes a pair of cutout sections 124A, 124B. In some embodiments, each of the rib portions 122 includes a raised portion 123 that is slightly raised above the surface of second portion 104. In these embodiments, when mounting bracket 100 is mounted to scan head frame 1000, small gaps are formed between raised portions 123 and side surface 1003 of scan head frame 1000.

Scan head frame 1000 includes a top surface 1004, a substantially vertical side surface 1003 and a longitudinal edge 1002 formed therebetween. In some embodiments, scan head frame 1000 includes cutouts 1006 to reduce the weight of the frame 1000. Alternatives include those wherein cutouts 1006 are not present. Embodiments include those wherein scan head frame 1000 includes at least one pair of bushings 1008 aligned along bushing axis 1009 at a distal end of scan head frame 1000. Bushings 1008 receive a guide rod (not shown) to facilitate reciprocating or back-and-forth movement of the scanner along the guide rod to permit the scanner to scan the entirety of an adjacent document.

Scan head frame 1000 includes a plurality of bracket mounting holes 1020 on top surface 1004 of scan head frame 1000 that correspondingly align with holes 110 to permit the mounting of bracket 100 on scan head frame 1000. In some embodiments, the plurality of bracket mounting holes 1020 are threaded to receive a screw or other type of threaded fastener. The example embodiment illustrated includes three bracket mounting holes 1020A, 1020B, 1020C that correspond with holes 110A, 110B, 110C. However, greater or fewer holes 1020 may be provided depending on the number of holes 110 in the first portion 102 of mounting bracket 100. Scan head frame 1000 also includes a pivot hole 1022 that correspondingly aligns with pivot hole 112 of mounting bracket 100. Further, it will be appreciated that, in lieu of one or more bracket mounting holes 1020, mounting bosses may project from upward from top surface 1004 and be received into holes 110.

Figure 2:
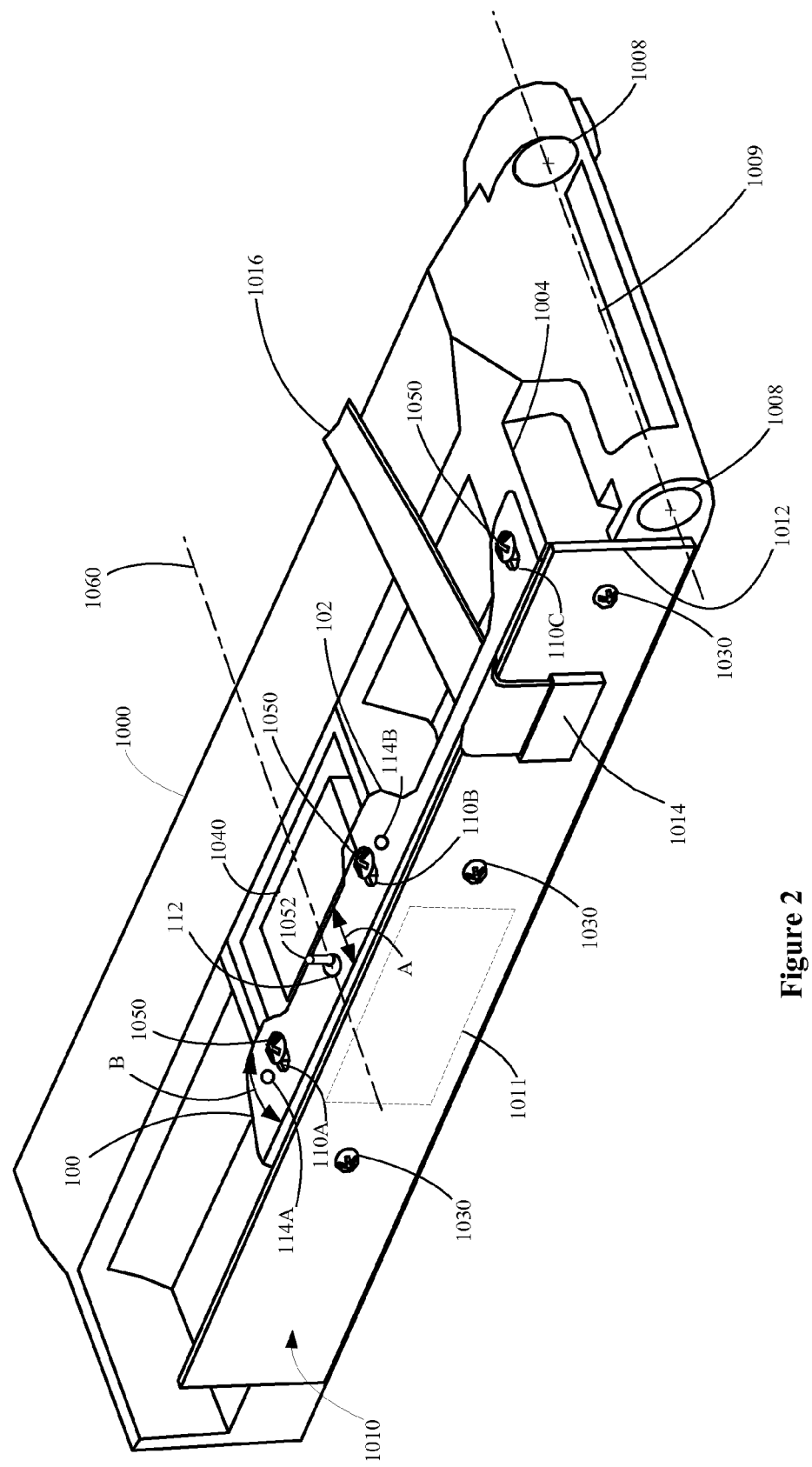
FIG. 2 is a perspective view of the mounting bracket of FIG. 1 supporting an image sensing unit and mounted on the scan head frame.

Referring now to FIG. 2, a perspective view of mounting bracket 100 supporting an image sensing unit 1010 on scan head frame 1000 is shown. Image sensing unit 1010 includes a printed circuit board (PCB) 1012 and an image sensor 1011 shown in dashed lines, such as a charge-coupled device, mounted thereon. In some embodiments, mounting bracket 100 is composed substantially of metal and acts as a heat sink for PCB 1012. Image sensing unit 1010 faces vertical side surface 1003 of scan head frame 1000 and the lens assembly 1044 of optical unit 1040. Specifically, image sensor 1011 is located on the side of the PCB 1012 facing side surface 1003. Image sensor 1011 receives and senses an image of the document being scanned from an optical unit 1040 mounted in scan head frame 1000. Optical unit 1040 includes a mirror assembly generally indicated as 1042 and a lens assembly generally indicated as 1044 which combine to form an image of the scanned document on image sensor 1011. Image sensing unit 1010 may further include components, such as a connector 1014 and a cable 1016 which are connected to a controller (not shown) for the image sensing unit 1010 to allow communication between the image sensor 1011 and the controller for capturing the image of the scanned document. Mounting bracket 100 extends substantially along the length of printed circuit board 1012. In one embodiment, printed circuit board 1012 is about 25 mm in height and about 200 mm in length. In this embodiment, second portion 104 has a length of about 150 mm.

Printed circuit board 1012 along with image sensor 1011 is mounted on second portion 104 of mounting bracket 100. One of more suitable fasteners 1030, such as screws or nut and bolt arrangements, may be used to mount PCB 1012 on second portion 104. It will be understood that PCB 1012 may include a set of holes that correspond to the plurality of holes 120 of second portion 104. In some embodiments, second portion 104 of mounting bracket 100 may be further mounted on scan head frame 1000. In such embodiments, side wall 1003 of scan head frame 1000 may include a plurality of holes, corresponding to and aligned with the plurality of holes 120 of second portion 104 for receiving fasteners, such as the fasteners 1030, therein.

Cutout section 124A of mounting bracket 100 is sized to accommodate image sensor 1011 so as to not block the image sensing area of image sensor 1011 when image sensing unit 1010 is mounted on scan head frame 1000. This allows image sensor 1011 to receive the image of the document being scanned from optical unit 1040. In the example embodiment shown, a second cutout section 124B is provided to reduce the weight of mounting bracket 100. In this embodiment, cable 1016 passes through the gap between PCB 1012 and second portion 104 of mounting bracket 100 that occurs as a result of raised portions 123. Cable 1016 then passes through cutout section 124B, under first portion 102 of mounting bracket 100 and along top surface 1004 of scan head frame 1000.

Holes 120A, 120B of second portion 104 of mounting bracket 100 are disposed on each side of cutout section 124A in order to provide stability for image sensor 1011 when image sensing unit 1010 is mounted on mounting bracket 100. In the example embodiment illustrated, a third hole 120C is also provided at a distal end of mounting bracket 100 in order to provide additional stability for printed circuit board 1012 when mounted on mounting bracket 100. Alternatives include those wherein only two holes 120A, 120B are provided in second portion 104 and those wherein more than three holes are provided in second portion 104 for additional stability.

First portion 102 of mounting bracket 100 is mounted on scan head frame 1000. Suitable fasteners 1050, such as screws, self tapping screws, or nut and bolt arrangements, may be used for attaching first portion 102 to scan head frame 1000. First portion 102 of mounting bracket 100 is mounted on top surface 1004 of scan head frame 1000 by providing fasteners 1050 through corresponding bracket mounting holes 1020 in top surface 1004 of scan head frame 1000 and holes 110 of mounting bracket 100. Specifically, holes 110A, 110B of mounting bracket 100 and corresponding bracket mounting holes 1020A, 1020B of scan head frame 1000 are disposed on each side of cutout section 124A in order to provide stability for image sensor 1011 when image sensing unit 1010 is mounted on scan head frame 1000. In the example embodiment illustrated, a third hole 110C and a corresponding third bracket mounting hole 1020C are provided at distal end of mounting bracket 100 and scan head frame 1000, respectively, in order to provide additional stability for mounting bracket 100 and image sensing unit 1010 when mounted on scan head frame 1000. Alternatives include those wherein only two sets of corresponding holes 110A, 110B and bracket mounting holes 1020A, 1020B are provided and those wherein more than three sets of holes are provided for additional stability.

Holes 110 and pivot hole 112 permit independent linear and angular adjustment of the image sensing unit 1010 relative to scan head frame 1000 and optical unit 1040. Holes 110 allow mounting bracket 100 and image sensing unit 1010 to be linearly or transversely adjusted (along a direction shown by arrow 'A') on scan head frame 1000. As a result, the distance between image sensor 1011 and optical unit 1040 can be increased or decreased as desired by moving mounting bracket 100 linearly relative to optical unit 1040. This permits adjustment of the focal length between image sensor 1011 and lens assembly 1044 of optical unit 1040 in order to allow lens assembly 1044 to focus a required magnified image of the object to be scanned onto image sensor 1011.

Specifically, adjustment of image sensing unit 1010 can be accomplished by first mounting image sensing unit 1010 on second portion 104 of mounting bracket 100. First portion 102 of mounting bracket 100 is then mated with scan head frame 1000 such that holes 110 align with bracket mounting holes 1020. Fasteners 1050 are then moderately tightened in order to mount mounting bracket 100 and, in turn, image sensing unit 1010 to scan head frame 1000 in a manner that permits slight angular or transverse movement of bracket 100. The linear position of mounting bracket 100 can be adjusted by moving holes 110 about fasteners 1050 and bracket mounting holes 1020. For example, FIG. 3A shows bracket mounting hole 1020 centered about hole 110 of mounting bracket 100. FIGS. 3B and 3C show mounting bracket 100 moved away from and toward scan head frame 1000, respectively. In the example embodiment illustrated, holes 110 are elongated holes or slots and bracket mounting holes 1020 are circular. A length 111 of holes 110 is greater than a diameter 1021 of bracket mounting holes 1020 to provide a range of adjustment 1024 for mounting bracket 100 relative to scan head frame 1000. Range of adjustment 1024 is equal to the difference between length 111 and diameter 1021. Alternatives include those wherein holes 110 are circular. In these embodiments, length 111 corresponds with the diameter of holes 110 such that the diameter of holes 110 is greater than diameter 1021 of bracket mounting holes 1020.

With reference back to FIG. 2, pivot hole 112 and holes 110 permit angular adjustment of mounting bracket 100 and image sensing unit 1010 relative to scan head frame 1000 and optical unit 1040. Pivot hole 112 is substantially aligned with a center axis 1060 of cutout section 124A and image sensor 1011 when image sensing unit 1010 is mounted on mounting bracket 100. Pivot hole 1022 in scan head frame 1000 and lens assembly 1044 are also substantially aligned with center axis 1060 in order to ensure proper image transfer from optical unit 1040 to image sensing unit 1010. In some embodiments, when first portion 102 of mounting bracket 100 is mated with scan head frame 1000, a pin 1052 is inserted through pivot hole 112 and corresponding pivot hole 1022 in order to fix the alignment of image sensor 1011 along center axis 1060. Alternatives include those wherein an additional fastener is inserted through pivot hole 112 and corresponding pivot hole 1022 rather than pin 1052.

Mounting bracket 100 can be angled or rotated (along a direction shown by arrow 'B') about pin 1052 in order to optically adjust the image sensing unit 1010 relative to optical unit 1040. Image sensing unit 1010 can be angularly adjusted until lens assembly 1044 focuses a uniform image of the object to be scanned on image sensor 1011. As discussed above, in some embodiments, adjustment of mounting bracket 100 may be facilitated by an alignment fixture engaged with fixture holes 114A, 114B. For example, FIG. 5A shows mounting bracket 100 and image sensing unit 1010 aligned substantially parallel with scan head frame 1000. FIGS. 5B and 5C show mounting bracket 100 and image sensing unit 1010 angled in opposite directions with respect to scan head frame 1000. Pin 1052 may be held in place by a fixturing jig (not shown). Alternatively, pin 1052 may be threaded and left in pivot holes 112 and 1022.

Pin 1052 has a diameter that is slightly smaller than a diameter 1023 of pivot hole 1022 in order to ensure precise placement of pin 1052 relative to optical unit 1040. With reference to FIGS. 4A-4C, embodiments include those wherein a diameter 113 of pivot hole 112 is larger than diameter D1 of pivot hole 1022 in order to permit adjustment of mounting bracket 100 with respect to scan head frame 1000. The difference between diameter 113 of pivot hole 112 and diameter 1023 of pivot hole 1022 is an adjustment range 1026 of mounting bracket 102. In one embodiment, adjustment range 1026 is about 2 mm.

When the desired linear and/or angular adjustment of image sensing unit 1010 is complete, pin 1052 is removed and the plurality of fasteners 1050 are securely tightened to fix first portion 102 to top surface 1004 of scan head frame 1000. This ensures the rigid and desired mounting of image sensing unit 1010 and image sensor 1011 on scan head frame 1000 by mounting bracket 100 allowing mounting bracket 100 to provide and to retain proper alignment between image sensing unit 1010 and optical unit 1040, which maintains a scanning quality of the scanner substantially intact for a lifetime of the scanner.

The foregoing description of several embodiments of the present disclosure has been presented for purposes of illustration. It is not intended to be exhaustive or to limit the present disclosure to the precise forms disclosed, and obviously many modifications and variations are possible in light of the above teaching. It is intended that the scope of the present disclosure be defined by the claims appended hereto.

What is claimed is:

1. A mounting bracket for an image sensing unit of a scanner, the mounting bracket comprising:
    a first portion having a plurality of elongated holes therein each for receiving a fastener to mount the mounting bracket to a scan head frame;
    a second portion extending from the first portion having a cutout section therein for allowing an image sensor of the image sensing unit to receive an image from an optical unit of the scanner;
    a pivot hole in the first portion centered about a width of the cutout section;
    wherein when the mounting bracket is mounted on the scan head frame, the elongated holes in the first portion permit linear adjustment of the mounting bracket relative to the scan head frame and the pivot hole in the first portion permits angular adjustment of the mounting bracket relative to the scan head frame for optically adjusting the image sensing unit.

2. The mounting bracket of claim 1, wherein the second portion includes a plurality of holes therein each for receiving a fastener to mount the image sensing unit to the second portion of the mounting bracket.

3. The mounting bracket of claim 2, wherein the second portion includes a plurality of rib portions each having one of the plurality of holes in the second portion therein.

4. The mounting bracket of claim 2, wherein the plurality of holes in the second portion includes a first hole adjacent to a first end of the cutout section and a second hole adjacent to a second end of the cutout section opposite the first end.

5. The mounting bracket of claim 4, wherein the plurality of holes in the second portion further includes a third hole disposed at a distal end of the mounting bracket.

6. The mounting bracket of claim 1, wherein the plurality of elongated holes in the first portion includes a first elongated hole adjacent to a first end of the cutout section and a second elongated hole adjacent to a second end of the cutout section opposite the first end.

7. The mounting bracket of claim 6, wherein the plurality of elongated holes in the first portion further includes a third elongated hole disposed at a distal end of the mounting bracket.

8. The mounting bracket of claim 6, wherein the first portion includes a first fixture hole therein adjacent to the first elongated hole and a second fixture hole therein adjacent to the second elongated hole.

9. The mounting bracket of claim 1, wherein the first portion and the second portion form a generally L-shaped cross-section.

10. A scan head for a scanner, comprising:
a scan head frame having a top surface and a side surface, the top surface having a plurality of holes therein;
an optical unit mounted to the scan head frame having a lens assembly;
an image sensing unit having an image sensor and being mounted to the scan head frame by a mounting bracket, the mounting bracket having a first portion and a second portion extending from the first portion, the image sensing unit being mounted to the second portion of the mounting bracket and facing the side surface of the scan head frame, the first portion of the mounting bracket having a plurality of holes therein, and the second portion of the mounting bracket having a cutout section therein that allows the image sensor to receive an image from the optical unit;
a first plurality of fasteners each extending through one of the plurality of holes in the first portion of the mounting bracket and a corresponding one of the plurality of holes in the top surface of the scan head frame to mount the mounting bracket to the scan head frame; and
a pivot hole in the first portion of the mounting bracket centered about the image sensor and aligned with a corresponding pivot hole in the top surface of the scan head frame;
wherein the plurality of holes in the first portion of the mounting bracket permit adjustment of the focal length between the image sensor and the lens assembly and the pivot hole in the first portion of the mounting bracket permits angular adjustment of the image sensor relative to the optical unit.

11. The scan head of claim 10, wherein the pivot hole in the first portion of the mounting bracket has a larger diameter than the corresponding pivot hole in the top surface of the scan head frame to provide a range of adjustment of the mounting bracket relative to the scan head frame.

12. The scan head of claim 10, wherein the plurality of holes in the first portion of the mounting bracket are one of circular and elongated, the corresponding holes in the top surface of the scan head frame are circular, and the plurality of holes in the first portion have a length that is greater than a diameter of the corresponding holes in the top surface of the scan head frame to provide a range of adjustment of the mounting bracket relative to the scan head frame.

13. The scan head of claim 10, further comprising:
a plurality of holes in the second portion of the mounting bracket;
a corresponding plurality of holes in the image sensing unit; and
a second plurality of fasteners each extending through one of the holes in the second portion of the mounting bracket and a corresponding one of the holes in the image sensing unit to mount the image sensing unit to the second portion of the mounting bracket.

14. The scan head of claim 13, wherein the second plurality of fasteners includes:
a first fastener extending through a first hole in the second portion of the mounting bracket adjacent to a first end of the cutout section and a corresponding first hole in the image sensing unit adjacent to a first end of the image sensor; and
a second fastener extending through a second hole in the second portion of the mounting bracket adjacent to a second end of the cutout section and a corresponding second hole in the image sensing unit adjacent to a second end of the image sensor.

15. The scan head of claim 14, wherein the second plurality of fasteners further includes a third fastener extending through a third hole in the second portion of the mounting bracket at a distal end of the mounting bracket and a corresponding third hole in the image sensing unit at a distal end of the image sensing unit.

16. The scan head of claim 13, wherein the second portion of the mounting bracket includes a plurality of rib portions each having one of the plurality of holes in the second portion therein.

17. The scan head of claim 10, wherein the first plurality of fasteners includes:
a first fastener extending through a first hole in the first portion of the mounting bracket adjacent to a first end of the cutout section and a corresponding first hole in the top surface of the scan head frame; and
a second fastener extending through a second hole in the first portion of the mounting bracket adjacent to a second end of the cutout section and a corresponding second hole in the top surface of the scan head frame.

18. The scan head of claim 17, wherein the first plurality of fasteners further includes a third fastener extending through a third hole in the first portion of the mounting bracket at a distal end of the mounting bracket and a corresponding third hole in the top surface of the scan head frame at a distal end of the scan head frame.

* * * * *